Jan. 5, 1926.

E. T. WILLIAMS 1,568,304

MAGNETIC COUPLING

Original Filed June 1, 1922    2 Sheets-Sheet 1

Inventor
E. T. Williams
By his Attorneys
Cooper, Kerr & Dunham

Jan. 5, 1926.
E. T. WILLIAMS
1,568,304
MAGNETIC COUPLING
Original Filed June 1, 1922  2 Sheets-Sheet 2
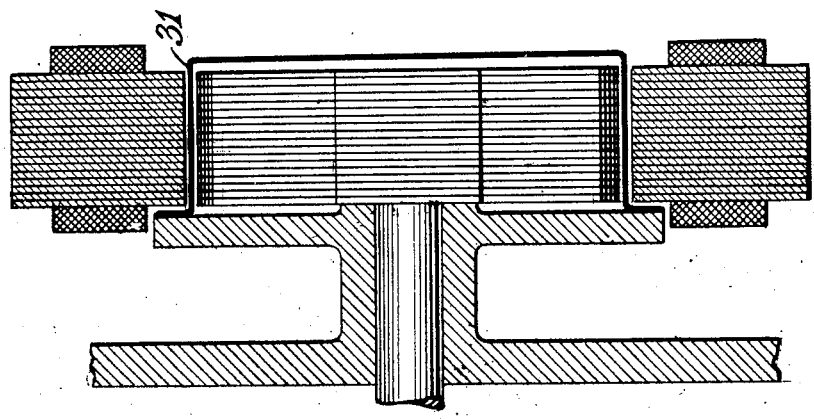
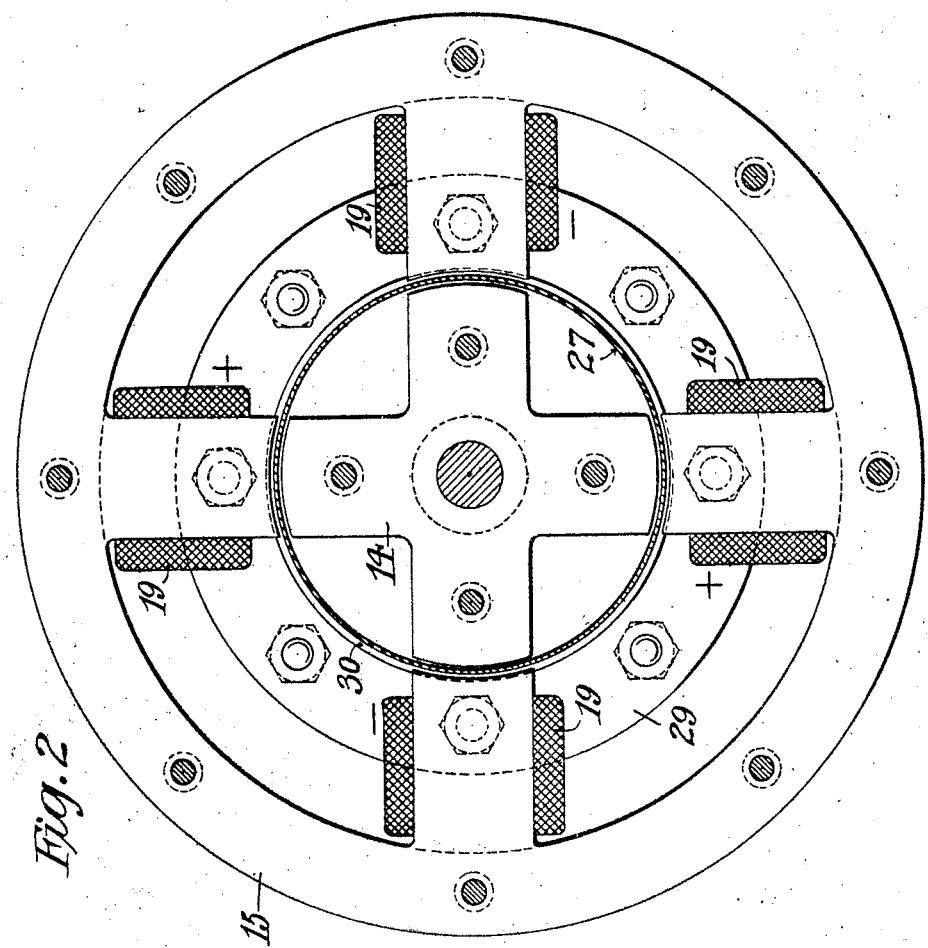
Inventor
E. T. Williams
By his Attorneys
Cooper, Kerr & Dunham Patented Jan. 5, 1926.

1,568,304

UNITED STATES PATENT OFFICE.

EDWARD T. WILLIAMS, OF BROOKLYN, NEW YORK, ASSIGNOR OF ONE-HALF TO WILLIAM O. SMITH, OF BROOKLYN, NEW YORK.

MAGNETIC COUPLING.

Application filed June 1, 1922, Serial No. 565,275. Renewed June 10, 1925.

*To all whom it may concern:*

Be it known that I, EDWARD T. WILLIAMS, a citizen of the United States of America, residing at Brooklyn, in the city of New York, county of Kings, and State of New York, have invented certain new and useful Improvements in Magnetic Couplings, of which the following is a full, clear, and exact description.

In machines for handling gases, as for example pumps, compressors, blowers, exhausters, and the like, in which a driving or other rotating shaft extends out of the machine for connection with an external shaft, considerable difficulty is experienced in preventing leakage out of or into the machine or casing, along or around the shaft. One method which has been proposed for meeting the conditions mentioned is to couple the two shafts magnetically, and cover the outer end of the inner shaft hermetically by means of a cylindrical cup of non-magnetic metal which will permit the magnetic flux of the driving element, rotating around the cup, to pass to the driven element housed in the cup. This method, however attractive in theory, has not been successful in practise heretofore; and it is accordingly the chief object of my present invention to provide a magnetic coupling of the type referred to, which shall be free from the defects that have made the prior devices unsuccessful. To this and other ends the invention consists in the novel features and combinations of elements hereinafter described.

One form of the invention is illustrated in the accompanying drawing, in which

Fig. 2 is a cross section on line 2—2 of Fig. 1.

Fig. 3 is a longitudinal section illustrating a prior type of construction.

Figure 1:
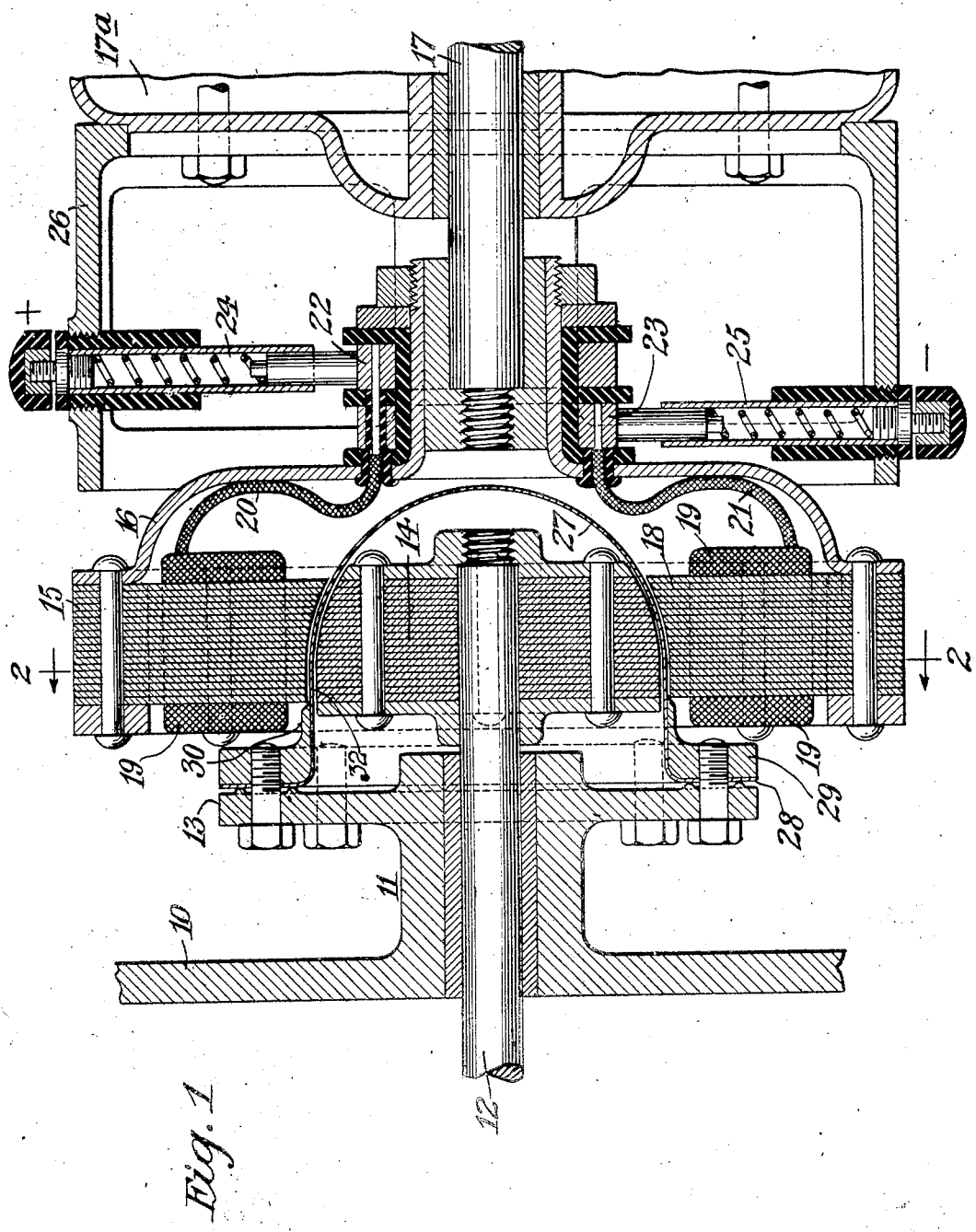
Fig. 1 is a longitudinal section through the axis of the coupling.

In the drawing, 10 represents the wall of a compresser or other machine, having a neck 11, constituting a bearing for a shaft 12 and formed at its outer end with a radial flange 13. Rigidly mounted on the outer end of the shaft is a magnetic coupling-member 14, preferably laminated, and cruciform in shape, and around the member 14 is an outer rotatable magnetic coupling member 15, mounted on a spider or disk-shaped carrier 16 which is fixed on the adjacent end of the driving shaft 17. The latter may be driven by any convenient means. For example it may be the armature shaft of an electric motor 17ª. In the particular construction shown, the outer member 15 is laminated and provided with salient pole-pieces 18, provided with magnetizing windings 19, which may be connected in series and so arranged as to make the magnetic poles alternately positive and negative as indicated by the plus and minus signs in Fig. 2. The winding terminals 20, 21, are connected to insulated slip rings 22, 23 on shaft 17. Energizing current is delivered to and received from the slip rings by means of brushes 24, 25, suitably mounted on a shell 26 carried by the motor 17ª.

From the foregoing it will be evident that magnetic flux between poles of opposite sign on the rotating outer coupling-member 15 passes through the inner member and couples the two together, so that the inner member is revolved in harmony with the outer.

In order to prevent leakage into or out of the casing 10 along the shaft 12, I cover the inner coupling member 14 with a sealing cup or shield 27 of non-magnetic metal, preferably phosphor bronze, having a radial flange 28 held firmly and hermetically on the flange 13 by means of a clamping ring 29. The latter has an axial flange 30 closely fitting and supporting the adjacent portion of the shield or seal 27.

Heretofore the practise has been to make the shield or seal substantially cylindrical in form, as indicated at 31 in Fig. 3. This shape has been the prime cause of lack of success in the prior constructions. In the first place, the gap between the inner and outer coupling members must be narrow in order to insure reasonable efficiency. This means that the metal shield must be made of thin sheet metal, to permit free rotation of the coupling members. But if the pressure inside of the shield is at all high, say 150 pounds or upwards, per square inch, sheet metal of adequate thinness cannot withstand such pressure without slight deformation, evidenced by outward bulging of the cylindrical walls. If, then, the coupling members are close enough together to make the apparatus efficient the bulging shield comes against the outer member and is speedily destroyed. On the other hand if the metal of the shield is thick enough to withstand the stresses exerted upon it the gap between the coupling members must be correspondingly wide and the efficiency of the apparatus is seriously lessened.

In my construction, however, the shield has a substantially spherical curvature throughout its unsupported area, preferably in the form of a hemisphere, as shown in Fig. 1, and the coupling members have their adjacent surfaces inclined, preferably having spherical curvature in close conformity to the shield, as shown. In this form the shield already has the maximum volume for its superficial area, and consequently there is no tendency for it to depart from the spherical shape. On the contrary the only tendency is to become a larger sphere. But this tendency is equal in all directions and hence to become larger all parts of the shell must stretch equally, which means that the total strength of the metal is fully utilized in resisting expansion. The net result is that there is no expansion at all, or if there is, it is so uniformly distributed over the entire shell that the increase in diameter is negligibly minute. I am therefore able to use for the shell a metal of only moderate tensile strength and still have it thin enough (say around .015 of an inch) to give satisfactory efficiency.

I do not mean to say that the entire unsupported area of the shell must be spherical. On the contrary the portion next to the supporting ring 29—31 can be otherwise shaped; for example cylindrical, as shown at 32, Fig. 1; but in such case the non-spherical part of the shell should be short, its axial length preferably not exceeding, say, about one fifth or one fourth of the diameter, and the coupling members should extend well over upon the spherical portion. Nor is it necessary to make the shell of metal having high tensile strength. Phosphor bronze is satisfactory in most if not all cases, and in general need not be more than .015 of an inch thick to withstand a pressure as high as 150 pounds per square inch without material elongation of the diameter. Other metals may be used which are substantially non-magnetic and have relatively low electrical conductivity.

It is to be understood that the invention is not limited to the specific details herein illustrated and described but can be embodied in other forms without departure from its spirit.

I claim—

1. The combination of a machine having a closed casing and an inner shaft extending through a wall of the later, an outer shaft, outer and inner magnetic coupling elements carried by said shafts to drive one from the other, and a sealing shell of which substantially all the unsupported area is of substantially spherical curvature enclosing the inner coupling element and heremetically sealed to the casing.

2. The combination of a machine having a closed casing and an inner shaft extending through a wall of the casing, an outer shaft, outer and inner magnetic coupling elements carried by said shafts to drive one from the other, and a sealing shell substantially hemispherical in form enclosing the inner coupling element and hermetically sealed to the casing.

3. The combination of a machine having a closed casing and an inner shaft extending through a wall of the latter, an outer shaft, outer and inner magnetic coupling elements carried by said shafts to drive one from the other, and a sealing shell of which substantially the entire unsupported area is of substantially spherical curvature enclosing the inner coupling element and hermetically sealed to the casing; the adjacent faces of the coupling elements being shaped in substantial conformity to the curvature of the shell.

4. The combination of a machine having a closed casing and a shaft extending through a wall thereof, a magnetic coupling element carried by the outer end of the shaft and having its outer surface substantially spherical in curvature, an outer shaft aligned with the inner shaft, a magnetic coupling element carried by the outer shaft, embracing the first mentioned coupling element and having its inner surface substantially spherical in curvature, and a substantially hemispherical sealing cup between the coupling elements and hermetically sealed to the said casing.

In testimony whereof I hereto affix my signature